United States Patent [19]

Caswell et al.

[11] 4,229,293

[45] Oct. 21, 1980

[54] DEWATERING OF SLIMES FROM PHOSPHATE ORES

[75] Inventors: Bruce F. Caswell, Whitmore Lake, Mich.; Ira E. Puddington, Ottawa, Canada

[73] Assignee: Canadian Patents and Development Limited, Ottawa, Canada

[21] Appl. No.: 194

[22] Filed: Jan. 2, 1979

[51] Int. Cl.$^2$ .................. B01D 21/01; C02B 1/20
[52] U.S. Cl. ..................... 210/727; 23/313 R; 209/5; 210/728; 210/729
[58] Field of Search ............. 75/3; 23/313 R; 209/5; 106/288 B; 210/42 R, 45, 47, 49, 51–54, 56, 59, 68, 46

[56] References Cited

U.S. PATENT DOCUMENTS

| | | | |
|---|---|---|---|
| 2,569,323 | 9/1951 | Maynard | 106/288 B |
| 3,189,433 | 6/1965 | Hollingsworth et al. | 23/313 R |
| 3,268,071 | 8/1966 | Puddington et al. | 209/5 |
| 3,368,004 | 2/1968 | Sirianni et al. | 23/313 R |
| 3,471,267 | 10/1969 | Capes et al. | 23/313 R |
| 3,680,698 | 8/1972 | Liu et al. | 210/46 |
| 3,771,971 | 11/1973 | Capes et al. | 23/313 R |
| 4,003,737 | 1/1977 | Caswell et al. | 210/59 |

Primary Examiner—Charles N. Hart
Assistant Examiner—Peter A. Hruskoci
Attorney, Agent, or Firm—Blanchard, Flynn, Thiel, Boutell & Tanis

[57] ABSTRACT

The aqueous slime waste product of a phosphate ore beneficiation process is dewatered by agglomerating the solids thereof using a conditioner and a hydrophobic bridging liquid.

5 Claims, 1 Drawing Figure

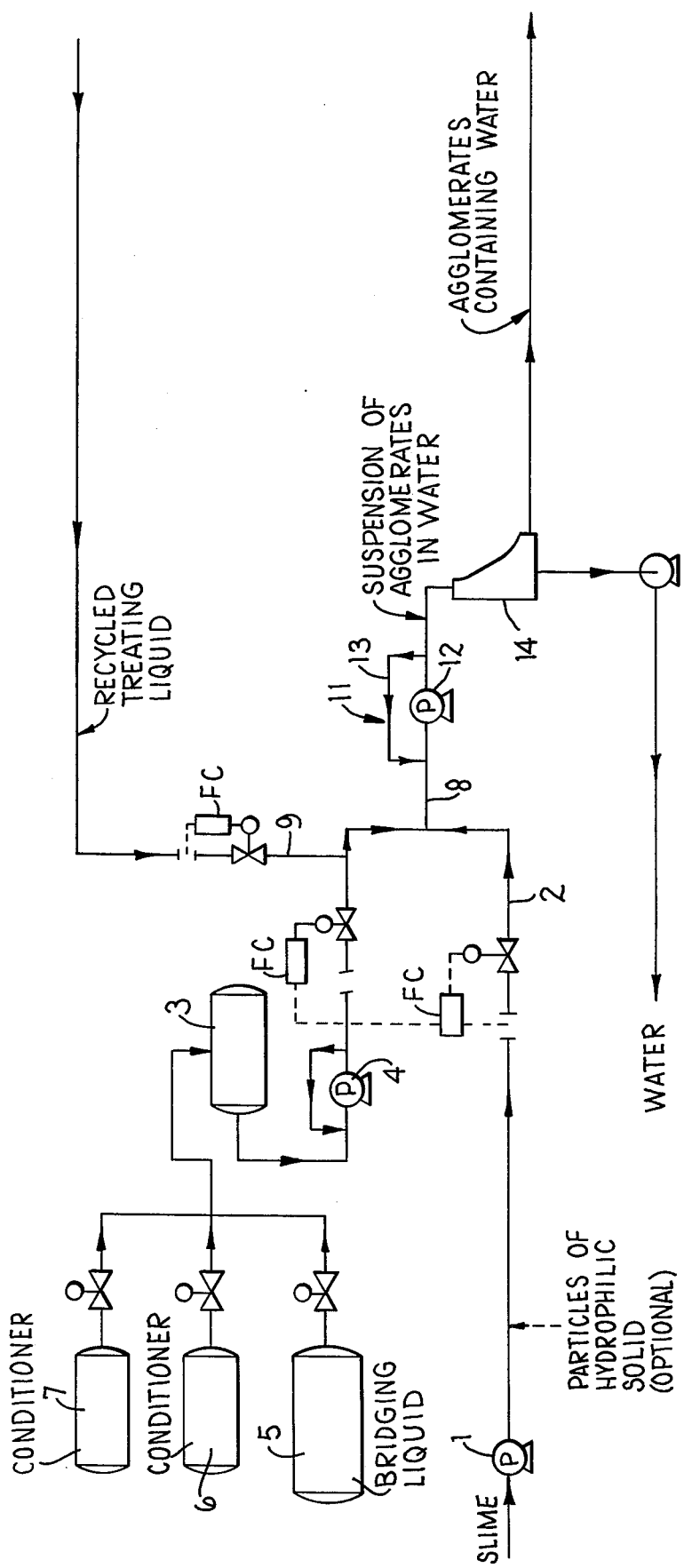

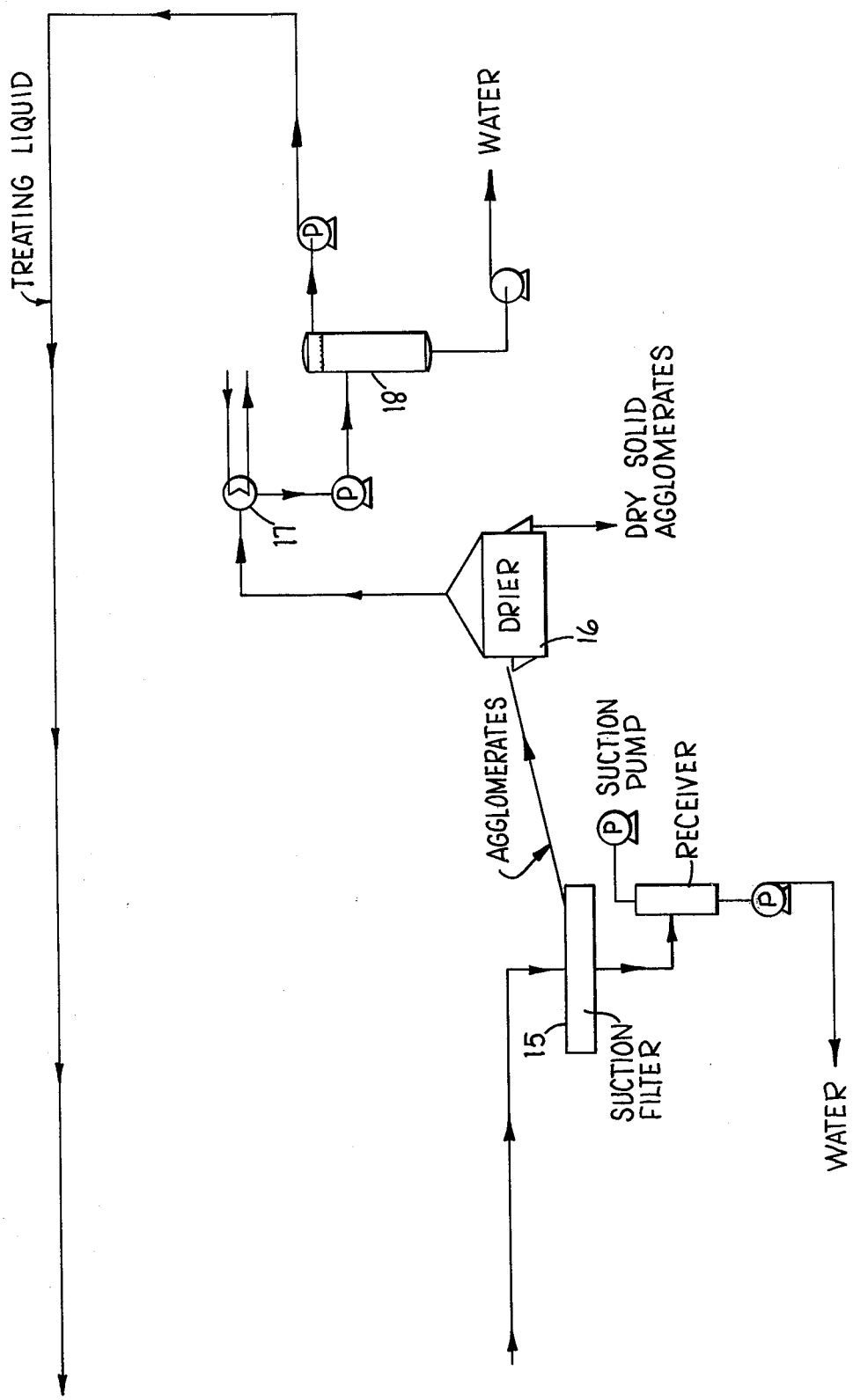

DEWATERING OF SLIMES FROM PHOSPHATE ORES

This invention relates to a process for dewatering the slime waste product of the phosphate ore mining and beneficiating industry.

Phosphate ore is mined and is beneficiated in order to recover the phosphate value thereof in a more concentrated form. In a conventional beneficiating process as practiced in the State of Florida, a slurry of phosphate ore is screened on a 150 mesh (Tyler) screen and the minus 150 mesh fraction is discarded. This minus 150 mesh fraction is commonly referred to as "slime". Similar slimes can be produced at other stages of the beneficiating process, for example, when the concentrated phosphate produce obtained by froth flotation is further treated to improve the quality thereof. The slimes are aqueous suspensions or colloidal dispersions containing, typically, on the order of from about one to 5 percent by weight of solids and the balance is water. The solids are clay-like substances. Very large quantities of slimes are produced in the phosphate mining industry. According to conventional practice, the slimes are disposed of by placing same in settling ponds, called slime ponds. The solids do not rapidly settle and it has been reported that some slime ponds have not dried out after 50 years. Slime ponds occupy large areas of land in the phosphate mining region in the State of Florida. The phosphate ore beneficiating process requires large amounts of water, typically about 10,000 gallons of water per ton of phosphate ore. A large percentage of this water is discharged with the slime and it cannot be recycled to the beneficiating process. The water requirements of the phosphate mining industry are very large. Further growth of the phosphate mining industry is hindered by the needs of other water users, such as farmers and the increasing population of Florida, and the need to limit the amount of fresh water that is withdrawn from the aquifer (fresh water source) in Florida in order to prevent serious and possibly irreparable injury to the aquifer.

It is an object of this invention to provide a process for dewatering the aqueous slime waste product of the phosphate ore mining and beneficiating industry so that the water contained in the slime can be recovered and recycled to the beneficiating process and so that the solids can be recovered in a more or less dry, concentrated, easily handled, agglomerated form suitable for disposal in a land fill or the like.

It is a further object of the invention to provide a process, as aforesaid, which is inexpensive and simple to perform, and which can be performed using conventional, readily available equipment.

The broad process of forming an agglomerated product, such as a pellet or a ball, from a liquid suspension of solid material or materials in a finely divided form has long been known and certain specific processes utilizing the basic concept are set forth in a variety of United States and other patents. Examples of these patents are those to Puddington and Farnand U.S. Pat. No. 3,268,071, Sirianni and Puddington U.S. Pat. No. 3,368,004 and Capes et al U.S. Pat. No. 3,471,267. Briefly, all three of these patents refer to a procedure wherein the powders are suspended in a first liquid which is lyophobic to said powders, a second or bridging liquid is then added thereto which is chosen or treated so as to be lyophilic to at least certain of said powders and the system is then agitated. This forms the material which is lyophilic to the bridging liquid into a plurality of agglomerates whose size and shape depend on the details of said procedure as same are set forth at length in said patents and to which reference is invited. These procedures may be and are used both for the separation of one of a mixture of solids from such mixture and such is the main purpose of the above-mentioned Puddington U.S. Pat. No. 3,268,071, or they may be and are used where the formation of an agglomerated product is the objective itself of the agglomeration procedure and such is the principal purpose of the other two patents above-named.

The invention provides a process for dewatering aqueous phosphate slimes and forming agglomerates of the solid particles contained in such slimes, which comprises the steps of:

a. adding to the aqueous slime waste product of phosphate ore beneficiation, (i) hydrophobic organic liquid which is immiscible with water and (ii) liquid conditioner effective to render hydrophobic the surfaces of the solid particles of the slime, whereby to form a two-phase liquid system containing said particles in suspension, b. agitating the two-phase liquid system to effect repeated collisions of said particles and thereby forming in said system a dispersion in water of agglomerates, said agglomerates consisting essentially of said solid particles of the slime and containing said hydrophobic organic liquid and said conditioner, c. discontinuing said agitation and separating said agglomerates from the water contained in the starting slime, and d. then drying said agglomerates and removing said hydrophobic liquid and said conditioning agent therefrom to obtain dry agglomerates.

Inasmuch as the present invention can make use of well-known equipment, the details of suitable equipment are not disclosed herein. Reference may be made to the three patents noted above, particularly U.S. Pat. Nos. 3,368,004 and 3,471,267 for further details concerning useful equipment and details of agglomeration procedures.

BRIEF DESCRIPTION OF THE DRAWING

The drawing is a schematic flow diagram of the process of the invention.

As described above, the aqueous slime material treated by the process of the present invention is a pumpable aqueous suspension or colloidal dispersion produced as a waste product of the phosphate ore beneficiation process. It usually contains from about one to about 5 percent by weight, typically about 4 percent by weight, of solids having a particle size of minus 150 mesh and the balance thereof is essentially water. However, the solid content of the slime is not critical and slimes containing greater or lesser concentrations of solids can be used in the invention.

The aqueous slime is pumped by a pump 1 through a conduit 2. A mixture of treating liquids which preferentially wets the solid particles of the slime is combined with the slime in the conduit 8. During start-up of the process, the mixture of treating liquids is fed from the tank 3 by pump 4. During steady-state operation, most of the mixture of treating liquids is recycled treating liquid supplied from conduit 9 and "make-up" treating liquid is supplied from tank 3. The liquid mixture is comprised of (1) a bridging liquid which is immiscible with water and displaces the water from the surfaces of the suspended solids and (2) one or more conditioners which change the wetting properties of the solids of the slime by being selectively absorbed on the surfaces of the solid particles to alter their normal surface properties, whereby the bridging liquid can displace the water from the surfaces of the solid particles. The bridging liquid is supplied from tank 5 and the conditioner or conditioners are supplied from tanks 6 and 7.

Useful bridging liquids include hydrophobic organic liquids such as liquid hydrocarbons including fuel oil, toluene and kerosene, nitrobenzene, chlorinated hydrocarbons such as carbon tetrachloride, perchloroethylene, and trichloroethane, and the like. The hydrophobic organic liquids are referred to as bridging liquids in view of their function of creating bridges between the solid particles whereby to form agglomerates. Conditioners are substances which are physically or chemically adsorbed at the solid-liquid interface. The conditioner will usually have a balanced hydrophilic-hydrophobic molecular structure and it is absorbed on the solid with the hydrophobic portion oriented outwardly so that the solid will be wetted by the bridging liquid. Organic acids such as tall oil, xanthates and their soluble salts, alcohols and long chain aliphatic amines, particularly primary amines $RNH_2$ wherein R is alkyl having 8 to 15 carbon atoms, all having a large hydrocarbon nucleus, are useful as conditioners, as is well known.

In the illustrated embodiment, fuel oil is employed as the bridging liquid. The conditioner is comprised of approximately equal amounts of tall oil and octylamine. The amounts of bridging liquid and conditioner are selected so that good quality, reasonably dense agglomerates are obtained in the following agglomeration step. The amounts can be determined by routine experimentation on the particular suspension of slime being treated. U.S. Pat. No. 3,368,004 describes the criteria for selecting the proportions and reference can be made thereto for additional description concerning this. Typically, the amount of conditioner (total of tall oil and octylamine in the disclosed embodiment) is from about 0.1 to 5% by weight and the amount of bridging liquid is from about 3% to 15% by weight, both percentages being based on the weight of the solids in the slime.

The streams of the aqueous slime and the mixture of conditioner and bridging liquid are combined in conduit 8. The flow rates of the various liquid streams are controlled by valves and flow controllers (FC) in a conventional way. The combined stream is agitated in an agglomeration mechanism 11 whereby to form agglomerates of the solids present in the slime. The agitating and agglomerating mechanism 11 can be selected from among the equipment known to be useful for this purpose including reciprocal shakers, rotating drums, pump loops (shown in the drawing), tanks with propeller-type agitators and in-line mixers. The particular equipment used will depend on the desired properties of the agglomerates, i.e. density. Shakers will be used when agglomerates of high density and strength are wanted. However, for most purposes, the agglomerates formed in the agglomeration mechanism 11 need not possess high density and strength. Under these circumstances a pump loop is a highly effective agitating and agglomerating apparatus and is preferred because of its ease of operation.

In the illustrated apparatus, the agglomeration mechanism is a pump loop comprised of a centrifugal pump 12 and a feedback conduit 13 for returning a selected portion of the discharge of the pump to the inlet thereof. If desired, a flow controller (not shown) can be provided in the feedback conduit 13 for adjusting the flow rate of the recycle stream and thereby controlling the average residence time of the combined stream in the pump loop. During the time they are present in the pump loop, the finely divided solid particles in the slime are formed into compact agglomerates wherein the finely divided particles are held together owing to the formation of liquid bridges between the particles caused by the presence of the bridging liquid. The bridging liquid is insoluble in and is immiscible with the aqueous liquid phase and it preferentially wets the finely divided particles by displacing the aqueous phase, whereby to cause the particles to bond together. The agglomerate produce discharged from the pump loop 11 is a slurry or suspension of agglomerates in an aqueous liquid phase. The particle size of the agglomerates is such that they can be readily separated from the aqueous liquid phase. Usually the agglomerates have a particle size of from about 1/16 to ¼ inch. They are relatively dense.

The agglomerates are then separated from the aqueous phase. In the illustrated embodiment, the product discharged from the pump loop 11 is fed onto a screen 14 wherein the freely drainable water passes through the screen and is recovered for recycling to the phosphate ore beneficiation process. Other apparatuses that can be used for this purpose are filters, settling vessels and centrifuges. The agglomerates, removed as the overflow, can be further dewatered by a suction filter apparatus 15, but this operation is not critically necessary. The agglomerates are then fed to a dryer 16 wherein they are heated to a temperature effective to vaporize therefrom almost all of the water remaining therein, plus the conditioner and bridging liquid. For example, the drier can be heated at a temperature of about 350° F.

The vapors from the dryer 16 are condensed in a condenser 17 and the condensate is fed to a separation tank 18 wherein the aqueous phase is separated from the organic phase. The organic phase is recycled to the agglomeration process via the conduit 9. The aqueous phase can be recycled to the phosphate ore beneficiation process.

The substantially dry agglomerates discharged from the dryer 16 may still contain minor amounts (up to about 1 percent by weight) of water, conditioning agent and bridging liquid. The agglomerates can be disposed of, for example, by burying them in a land fill. It may also be desirable to further process these agglomerates to remove valuable substances contained therein, if such is desirable and economically advantageous to do so.

MODIFICATION

Agglomerates possessing improved properties are obtained when particles of a hydrophilic solid are added to and mixed with the slime prior to the agglomerating step. The hydrophilic solid has a particle size in the range of about 0.1 to 5.0 mm. It is added in an amount up to about 60 percent by weight, preferably from about 20 to 50 percent by weight, based on the weight of the solids in the slime. The hydrophilic solid can be an inexpensive material such as sand, cement tailings, limestone, fly ash, clinkers and the like. The use of sand is preferred. The hydrophilic particles appear to function as solid nucleating agents for improving the efficiency of the agglomeration step. The agglomerates produced using the hydrophilic particles are more dense and easy to handle, in comparison to the agglomerates produced without using the hydrophilic particles.

EXAMPLE

The aqueous slime waste product of a phosphate ore beneficiation process, containing 4 percent by weight of solids having a particle size of minus 150 mesh is fed at a rate of 3,000 gallons per minute (GPM) through conduit 2. A mixture of conditioner and bridging liquid is flowed from tank 3 at a rate of about 8.8 GPM. The mixture comprised about 80 percent by weight of perchlorethylene, 10 percent by weight of tall oil and 10 percent by weight of octylamine. The two streams are combined in conduit 8 and are fed to a pump loop 11 having a volumetric capacity of 9,000 GPM, whereby to provide an average residence time of the combined streams in the pump loop of about 3 minutes. The discharge (slurry) of the pump loop is fed onto a screen 14 of 10 mesh size and 2866 GPM of water and fine particles is removed as the underflow. The overflow (about 1880 pounds per minute, 60% solids) is fed to a vacuum dryer 15 wherein an additional amount of about 76.8 GPM of water is removed. The overflow (about 1240 pounds per minute, about 91% solids) is fed into dryer 16 operating at 350° F., whereby 12.3 GPM of water and 8.8 GPM of organic phase are removed as vapor. The solids from dryer 15 comprise about 99 percent by weight of solids in the form of agglomerates which can be buried in a land fill. There is recovered about 1030 pounds per minute of solids. The vapors are condensed in the condenser 17 and the organic phase is separated from the aqueous phase in the separator 18. The organic phase is a mixture of the bridging liquid and conditioners and it can be recycled to the agglomeration step.

In a modified process, 250 pounds per minute of sand is added to and mixed in the slime as it flows through conduit 2. There is recovered about 1280 pounds per minute of agglomerated solids in which the solids of the slime are carried on the sand particles.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for dewatering an aqueous slime waste product of phosphate ore mining and beneficiation, said aqueous slime waste product containing from about 1 to 5 percent by weight of solid phosphate ore particles having a particle size of less than 150 mesh and the balance is essentially water, which consists essentially of the steps of: adding to said aqueous slime waste product (a) from 3 to 15 percent by weight, based on the weight of said solid particles in said aqueous slime waste product, of a hydrophobic organic bridging liquid which is immiscible with water, said hydrophobic organic bridging liquid being selected from the group consisting of liquid hydrocarbons, nitrobenzene and chlorinated liquid hydrocarbons, and (b) from 0.1 to 5 percent by weight, based on the weight of said solid particles in said aqueous slime waste product, of a liquid conditioning agent effective to render the surfaces of said solid particles hydrophobic to form a twophase liquid system, said liquid conditioning agent having a balanced hydrophilic-hydrophobic molecular structure and capable of being adsorbed by said solid particles with the hydrophobic portion oriented outwardly, said liquid conditioning agent being selected from the group consisting of tall oil, xanthates, alcohols having a large hydrocarbon nucleus and primary amines having the formula $RNH_2$ wherein R is alkyl having 8 to 15 carbon atoms; agitating the two-phase liquid system to effect repeated collisions of said solid particles and thereby forming in said system a dispersion of agglomerates in said liquid system, said agglomerates consisting essentially of agglomerates of said solid particles wherein said solid particles are bound together by said hydrophobic organic bridging liquid; discontinuing said agitating; and separating said agglomerates from water, said hydrophobic organic liquid and said liquid conditioning agent.

2. A process according to claim 1 in which said separating step is performed by mechanically separating free water from said agglomerates and then drying said agglomerates by vaporizing and removing substantially all the water, hydrophobic organic bridging liquid and liquid conditioning agent contained in said agglomerates.

3. A process according to claim 1 including the step of adding to said aqueous slime waste product, prior to said agitating step, particles of a substantially water-insoluble hydrophilic solid having a particle size in the range of 0.1 to 5.0 mm whereby said agglomerates contain said hydrophilic solid particles.

4. A process according to claim 3 wherein the amount of said hydrophilic solid particles is from about 20 to about 50 percent by weight, based on the weight of the solid particles in said aqueous slime waste product.

5. A process according to claim 4 wherein said hydrophilic solid particles consist essentially of sand.

* * * * *